United States Patent
Zellers

(10) Patent No.: US 6,196,551 B1
(45) Date of Patent: Mar. 6, 2001

(54) RADIAL LIP SEAL WITH INTEGRAL SPLASH LIP

(75) Inventor: Steven Wayne Zellers, Indianapolis, IN (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/149,352

(22) Filed: Sep. 8, 1998

(51) Int. Cl.⁷ ........................................ F16J 15/32
(52) U.S. Cl. ..................... 277/402; 277/562; 60/330; 60/366
(58) Field of Search ....................... 277/552, 562, 277/656, 568; 60/330, 366, 358; 192/112

(56) References Cited

U.S. PATENT DOCUMENTS

| | | | |
|---|---|---|---|
| 3,443,814 | * 5/1969 | Dahlheimer | 277/552 |
| 3,952,508 | * 4/1976 | Bopp | 60/330 |
| 4,428,630 | * 1/1984 | Folger et al. | 277/532 |
| 4,613,143 | * 9/1986 | Butler | 277/569 |
| 5,009,435 | * 4/1991 | Villanyi et al. | 277/552 |
| 5,398,942 | * 3/1995 | Duckwall et al. | 277/353 |
| 5,501,469 | * 3/1996 | Ducugnon et al. | 277/551 |
| 5,720,167 | 2/1998 | Marich | 60/339 |
| 5,852,931 | * 12/1998 | Reichenmiller et al. | 60/330 X |

FOREIGN PATENT DOCUMENTS

| 1201692 | * 9/1965 | (DE) | 60/330 |
|---|---|---|---|
| 1015244 | * 7/1952 | (FR) | 60/330 |

* cited by examiner

Primary Examiner—Anthony Knight
Assistant Examiner—Enoch E. Peavey
(74) Attorney, Agent, or Firm—Laura C. Wideman

(57) ABSTRACT

A seal structure has a seal lip and a splash lip. The splash lip is disposed to contact a rotating shaft at an axial location intermediate the seal lip and a support bushing to prevent a high velocity oil stream, departing between the bushing and the shaft, from impinging the seal lip prior the velocity of the oil stream being reduced.

1 Claim, 2 Drawing Sheets

RADIAL LIP SEAL WITH INTEGRAL SPLASH LIP

TECHNICAL FIELD

This invention relates to lip seals, and more particularly, to torque converter lip seals having a sealing lip and a splash lip to prevent a stream of oil with high velocity energy from directly impinging the sealing lip.

BACKGROUND OF THE INVENTION

Power transmissions include a torque converter which is effective to transmit power from an engine to a multi-speed power transmission. The torque converter permits the transmission to operate at a neutral condition without disengaging the clutches and/or brakes in the transmission. The torque converter will also provide power to a power take-off gear (PTO). When significant PTO power or high engine power without vehicle travel is required, the transmission gearing is placed in neutral so that the engine can operate at elevated power levels.

In vehicles such as cement mixers, the throttle setting and therefore the engine speed and power requirement can be quite high during load mixing. Engine speeds in the range of 2000 to 3000 rpm are not uncommon during these operations. Since the hydraulic control pump is driven directly by the torque converter impeller, the pump speed, output volume and torque converter pressure are quite high. Under this condition, a significant amount of oil is circulated to the torque converter and the lubrication and cooling circuits causing an increase in the volume of oil sent to the lubrication and cooling circuit; and also to the bushing supporting the hub connecting the impeller with the control pump.

Under this condition, it has been found that an inordinate amount of oil can bypass a lip seal which sealingly abuts the control pump drive hub on the torque converter impeller. The area beyond the seal is open to atmosphere therefore, any leakage which occurs will be visible. It has been noted that this condition appears after many hours of operation and not in transmissions newly put into use.

One solution to the problem is found in U.S. patent application Ser. No. 09/149,126, filed Sep. 8, 1998, which is assigned to the assignee of this application.

SUMMARY OF THE INVENTION

Testing of prior art transmissions, after leakage is observed has resulted in the following conclusions. Transmission input speed, converter inlet pressure, and sump temperature have much influence on the leaks. It has also been noted that increasing the diametral clearance of a bushing axially adjacent the lip seal increases the leakage. Placing additional exhaust passages in the chamber between the bushing and seal does not alleviate the problem.

Therefore, it is an object of the present invention to provide an improved seal structure for reducing the oil velocity along a rotating shaft.

In one aspect of the present invention, a splash lip is disposed axially along the shaft between a support bushing and a sealing lip to reduce the energy in a high velocity stream of oil leaving the bushing.

In another aspect of the present invention, the splash lip is comprised of a flexible portion and a rigid portion.

In yet another aspect of the present invention, the splash lip and the seal lip are secured in axial relation by a casing which is secured in a housing.

In a further aspect of the present invention, the rigid portion of the splash lip has apertures for permitting lubrication oil to contact the sealing lip after the energy of the oil stream is reduced.

In a yet further aspect of the present invention, the flexible portion of the splash lip conforms to the diameter of the shaft and is orientated to increase contact therewith when impinged by the stream of oil.

After much testing, it was determined that the converter-in pressure at the transmission control pump side of the bushing had little effect on the amount of leakage. The pressure in the chamber between the bushing and the seal likewise did not significantly influence the leakage. The inventor then considered that the velocity of the oil leaving the bushing and impinging on the seal lip was a primary factor of this phenomenon. The aforementioned object and aspects provide a solution to the problem. The structure proposed, reduces the axial velocity of the oil leaving the bushing prior to reaching the lip of the oil seal.

DESCRIPTION OF AN EXEMPLARY EMBODIMENT

Figure 1:
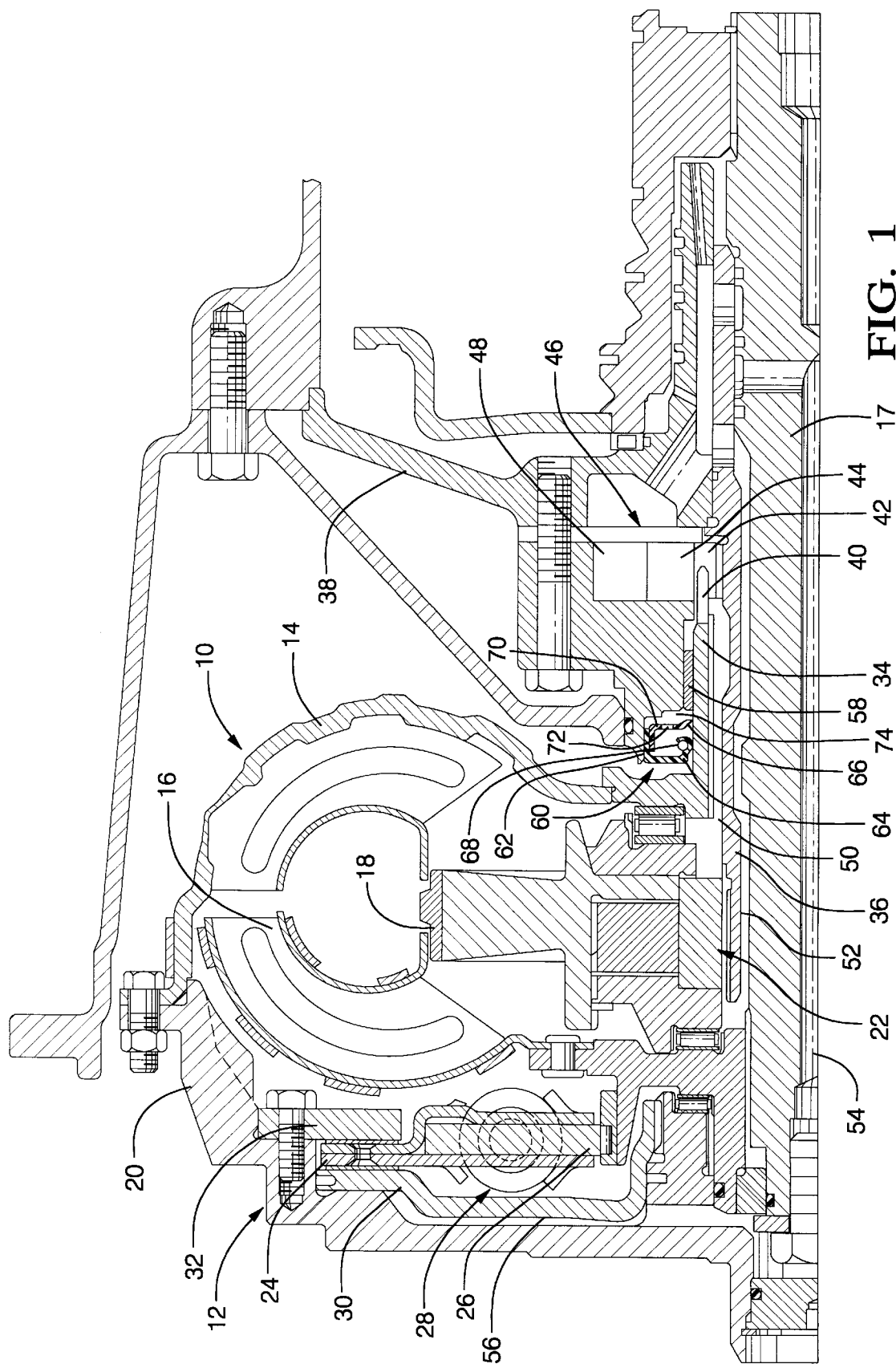
FIG. 1 is a cross-sectional elevational view of a torque converter assembly incorporating a bushing and seal structure corresponding to an embodiment of the present invention.
Figure 2:
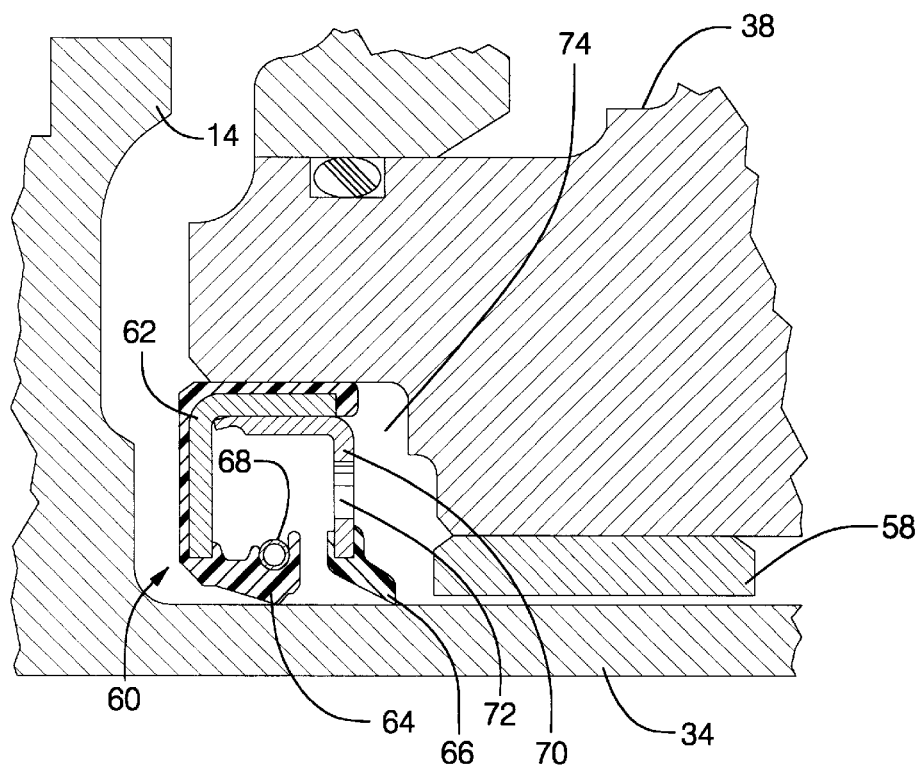
FIG. 2 is an enlarged elevational view of a portion of the assembly of FIG. 1.

Referring to the drawings, where like characters represent the same or corresponding parts throughout the several views, there is seen in FIGS. 1 and 2, a torque converter assembly 10, including a torque converter clutch assembly 12, an impeller 14, a turbine 16 and a stator 18. The torque converter assembly 10 is a convention drive mechanism well-known to those skilled in the art. The impeller 14 receives input power from an engine, not shown, through an input shell 20. Hydraulic fluid or oil is circulated by the impeller 14 to transfer power to the turbine 16 which is drivingly connected with a transmission input shaft 17.

The stator 18 redirects the hydraulic fluid for reentry to the impeller 14. This results in a speed ratio between the impeller 14 and the turbine 16 as well as a torque multiplication. Maximum torque multiplication occurs when the turbine is stationary and the impeller rotates at high speed. This is the "stall" operation of the torque converter 10 during which the stator is prevented from reverse rotation by a conventional one-way torque transmitter 22. When the speed ratio (impeller/turbine) reaches a predetermined design point, the fluid exiting the turbine 14 impinges on the back side of the blades of the stator 18 causing forward rotation and a reduction in torque multiplication. The one-way torque transmitter 22 permits the forward rotation of the stator. This operation is well-known.

The torque converter clutch 12 has an input member 24, an output member 26 and a conventional vibration damper 28 connected therebetween. The input member 24 is frictionally engaged between a piston 30 and a pressure plate 32 to ensure conjoint rotation with the input shell 20. The output member 26 is drivingly connected with the transmission input shaft 17. The damper 28 reduces the engine torsional vibration imposed on the input shell 20 in a well-known manner when the clutch 12 is engaged. Those familiar with the transmission art will be aware that the torque converter clutch 12 is engaged when the torque converter assembly 10 approaches the "coupling stage"; which stage occurs when the impeller speed and the turbine speed are almost equal. The engagement of clutch 12 improves the overall efficiency of the transmission.

The impeller 14 has a pump drive hub 34 which extends axially in coaxial relation with a stator shaft 36 and the transmission input shaft 17. A stator shaft 36 is secured to a transmission housing 38 to provide a ground for the one-way torque transmitter 22. The pump drive hub 34 has drive tangs 40 which engage drive tangs 42 formed on a gear member 44 of a conventional positive displacement gear pump 46. The gear member 44 meshes with another gear member 48 in a well-known manner. The assembly and operation of such pumps is known to those skilled in the art, such that a more complete description is not considered necessary at this point.

The pump 46 supplies hydraulic oil at elevated pressures for use by the transmission torque transmitters, not shown, the torque converter assembly 10, the torque converter clutch 12, as well as the transmission control valuing, lubrication and cooling in a well known manner. The torque converter assembly 10 receives fluid from a passage 50 formed between the hub 34 and the stator shaft 36. Hydraulic oil is returned from the torque converter assembly 10 through a passage 52 formed between the transmission shaft 17 and the stator shaft 36. The torque converter clutch 12, when engaged, is pressurized by hydraulic oil in a passage 54 formed in the shaft 17 and delivered to a chamber 56 between the piston 30 and the input shell 20. The torque converter clutch 12 is held disengaged by oil in the torque converter assembly 10 when the passage 54 is not pressurized.

The hub 34 is rotatably supported in a bushing 58 secured in the housing 38. Since the bushing 58 requires lubrication, a space between the hub 34 and the housing 38 is open to the oil in passage 50 which feeds the torque converter assembly 10. A seal assembly 60 is provided to prevent the lubrication oil passing through the bushing 58 from leaking to atmosphere around the outside of the torque converter assembly 10.

The seal assembly 60 has a casing 62 secured in the housing 38, a lip 64 which sealingly contacts the hub 34 and a garter spring 68 which urges the lip 64 into abutment with the hub 34. The seal assembly 60 also includes a flexible splash lip 66 which is sufficiently flexible to ensure contact with and conformity to the hub 34. The splash lip 66 is secured to a rigid case member 70 which in turn is secured in the casing 62. One or more apertures 72 are formed in the member 70. The usefulness of the structure of seal assembly 60 and, in particular, the splash lip 66 will become more apparent with the following description of intermittent operation of the torque converter assembly 10.

The torque converter assembly 10, during much of its operation, is transmitting power from an engine to a multi-speed transmission. However, there are operating procedures undertaken by the vehicle in which the torque converter assembly 10 is installed that do not include the gearing portion of the transmission. During these periods, the transmission gearing is placed in neutral and the engine is operated at an elevated idle speed. The elevated idle speed can be in the range of 2000 to 3000 rpm. Also, in the neutral condition, the feed pressure to the torque converter is elevated in the passage 50. During the elevated idle operation, the oil passes through the torque converter in the normal fashion but an inordinate amount of oil passes through the bushing into a chamber 74 between the seal assembly 60 and the bushing 58 and through the apertures 72 to provide lubrication for the lip 64.

The oil passes through the bushing 58 and exits into the chamber 74 at a high velocity and with a considerable amount of velocity energy. The high velocity oil impinges the splash lip 66 which reduces the velocity energy such that the pressure level of the fluid increases. The flexible splash lip 66 is orientated to the hub 34 such that the velocity energy of the oil stream will increase the sealing force therebetween. However, the high velocity oil cannot impinge the lip 64 of the seal assembly 60. The lip 64 of seal assembly 60 can adequately seal against the increased oil pressure in chamber 74 for the time period it takes to relieve the large volume of pressurized oil passing through the bushing 58. The oil in chamber 74 is returned to the transmission sump in a conventional manner through a passage, not shown, formed in the housing 38.

Figure 3:
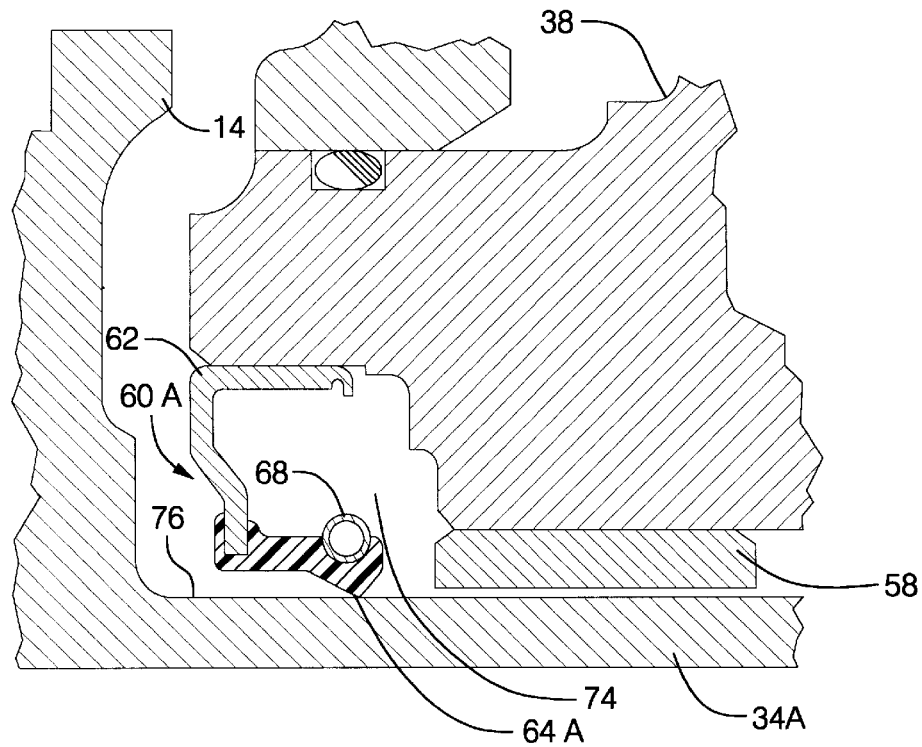
FIG. 3 is an elevational view similar to FIG. 2 depicting a prior art assembly.

It is believed that the prior art structures, such as that shown in FIG. 3, permit the oil to leak to atmosphere during this condition. The high velocity oil impinging on the lip 64A of seal assembly 60A causes the lip 64A to be lifted from the surface of the hub 34A resulting in oil leakage under the lip 64A to atmosphere. The present invention, as described above with reference to FIGS. 1 and 2, prevents the lifting of the seal lip 64 and therefore confines the oil passing through the bushing 58 to the chamber 74 prior to its return to the transmission sump.

What is claimed is:

1. A torque converter assembly comprising:

a housing;

a rotating shaft member extending in the housing;

a control pump driven by the rotating shaft member and supplying high pressure oil to the torque converter assembly wherein the control pump includes a hub that engages the rotating shaft member;

a bushing secured in the housing and rotatably supporting the hub with a space defined between the hub and the housing forming an oil passage that is in a downstream oil flow relation with the control pump; and a lip seal including a seal casing secured in a housing with a sealing lip secured in the seal casing and being disposed to sealingly contact the rotating shaft member and a splash lip secured in the seal casing downstream of the bushing and having a flexible portion disposed in contact with the rotating member to intercept a stream of high velocity oil emitting from the bushing prior to the oil coming into contact with the sealing lip, the splash lip having a rigid portion and the flexible portion being secured to the rigid portion, the seal casing securing the sealing lip and the splash lip rigid portion in relative axial position, with an opening in the splash lip rigid portion permitting the oil from the oil stream to contact the sealing lip subsequent to the velocity of the stream being reduced.

* * * * *